United States Patent

[11] 3,588,671

[72] Inventors Gordon J. Deboo
Sunnyvale;
Roger C. Hedlund, San Jose, Calif.

[21] Appl No 793,823
[22] Filed Jan. 24, 1969
[45] Patented June 28, 1971
[73] Assignee The United States of America as represented by the Administrator of the National Aeronautics and Space Administration

[54] PRECISION RECTIFIER WITH FET SWITCHING MEANS
3 Claims, 4 Drawing Figs.

[52] U.S. Cl. .......... 321/47, 307/251, 307/261
[51] Int. Cl. .......... H02m 7/02, H03k 5/20
[50] Field of Search .......... 321/8, 43, 46, 47; 307/261, 251, 235, 236; 328/26; 330/9, 38 (FE); 324/119

[56] References Cited

UNITED STATES PATENTS

| | | | |
|---|---|---|---|
| 3,502,905 | 3/1970 | Bicking | 307/251X |
| 3,509,372 | 4/1970 | Bicking | 307/251X |
| 3,196,291 | 7/1965 | Woodward | 307/261X |
| 3,419,784 | 12/1968 | Winn | 321/8 |
| 3,466,526 | 9/1969 | Cole | 307/251X |

*Primary Examiner*—William H. Beha, Jr.
*Attorneys*—Darrell Brekke and G. T. McCoy

ABSTRACT: A precision full-wave rectifier uses a single operational amplifier which is operated simultaneously as a linear amplifier and a switch driver. A pair of FETs are utilized as voltage responsive switches for effecting the rectifying operation and are gated in response to the output of the operational amplifier.

INVENTORS
GORDON J. DEBOO
ROGER C. HEDLUND
BY
ATTORNEYS

PRECISION RECTIFIER WITH FET SWITCHING MEANS

The invention described herein was made by employees of the United States Government and may be manufactured and used by or for the Government for governmental purposes without the payment of any royalties thereon or therefor.

BACKGROUND OF THE INVENTION

In modern computing apparatus, and other types of electrical signal translating devices, means are often provided for converting an alternating current input signal to a direct current signal for purposes of comparison or measurement. In precision computation and measuring equipment of extreme accuracy, for example, it is necessary that the signal converting circuits effect the translation of electrical signals without distortion over the entire range of operation of the equipment. Although rectification may be accomplished by any of a number of simple diode rectifier circuits, operational amplifiers are now widely used in precision linear rectifiers to overcome the limitations of the simple diode rectifier circuits. The problem, however, is that in order to obtain full-wave rectification at least two operational amplifiers and six matched resistors are required in the circuit.

While presently available signal conversion circuitry of this type has generally been satisfactory for certain types of applications, it has not been entirely satisfactory for all precision applications. One disadvantage is that additional power must be provided for operating the additional operational amplifiers. Furthermore, the use of diodes as switches, as is typically the case, can introduce errors at high temperatures since leakage current can flow in the signal paths.

SUMMARY OF THE INVENTION

This invention relates generally to apparatus for converting alternating current electric signals to direct current signals, and more particularly, to an improved precision full-wave rectifier circuit for rectifying incoming electrical signals having either positive or negative polarity, and producing in response thereto a positive only output signal, or in the alternative, a negative only output signal for either input polarity.

Briefly, the present invention is comprised of two parallel circuits having common input and output terminals, each including a semiconductor-type switching element, the operation of which is controlled by a single operational amplifier. The operational amplifier is responsive to the input signal and operates simultaneously as a linear amplifier and as a switch driver.

A principal advantage of the present invention over prior art full-wave rectifiers of this type is that only one operational amplifier is required.

Another advantage of the circuit is that is it uses only two precision resistors instead of the six or more precision resistors normally required.

Still another advantage of the present invention is that the system uses a pair of field-effect transistors as switches so as to minimize temperature sensitive offsets.

Still another advantage of the present invention is that since only one operational amplifier is used, the power requirements of he circuits are reduced substantially.

Still another advantage of the present invention is that only two matched components and only one amplifier is required to give full-wave rectification.

It is therefore a principal object of the present invention to provide a precision rectifier apparatus which requires only one operational amplifier in order to provide full-wave rectification of any input signal.

These and other features and objects of the invention are pointed out with particularity in the claims annexed to and forming a part of this specification. The invention itself, however, both as to its organization and manner of operation, together with further objects and advantages thereof, will be best understood with reference to the following description taken in connection with the accompanying drawings.

IN THE DRAWINGS

DESCRIPTION OF THE PREFERRED EMBODIMENT

Figure 1:
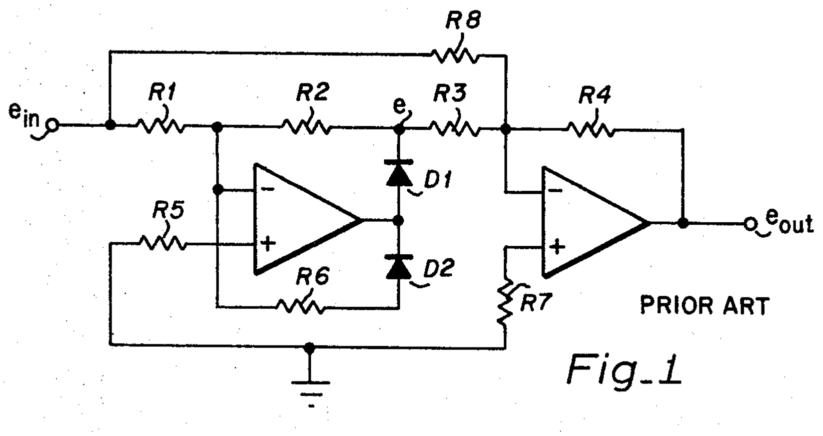
PRIOR ART Fig 1
FIG. 1 is a schematic illustration of a rectifier circuit in accordance with the prior art.

Referring now to FIG. 1 of the drawing, there is illustrated a prior art full-wave rectifier. The operative characteristics of this device can be obtained by referring to the Handbook of Operational Amplifier Applications, published by Burr-Brown Research Corp., page 73. Briefly the operation is as follows: When $e_{in}$ is positive, +1 volt for example, $D_1$ will not conduct and the potential at point $e$ will be 0 volts. Thus, $e_{out}$ will be equal to $-e_{in}-2e=-(+1)-2(0)=-1$ volt. But, when $e_{in}$ is negative, −1 volt for example, $D_1$ will conduct and the voltage at point $e$ will be +1 volt. Thus, $e_{out}$ will be equal to $-(-1)-2(+1)=-1$ volt again. Therefore, with $e_{in}$ either plus or minus the output is always negative so as to produce true rectification of the input signal.

Figures 2, 3, 4:
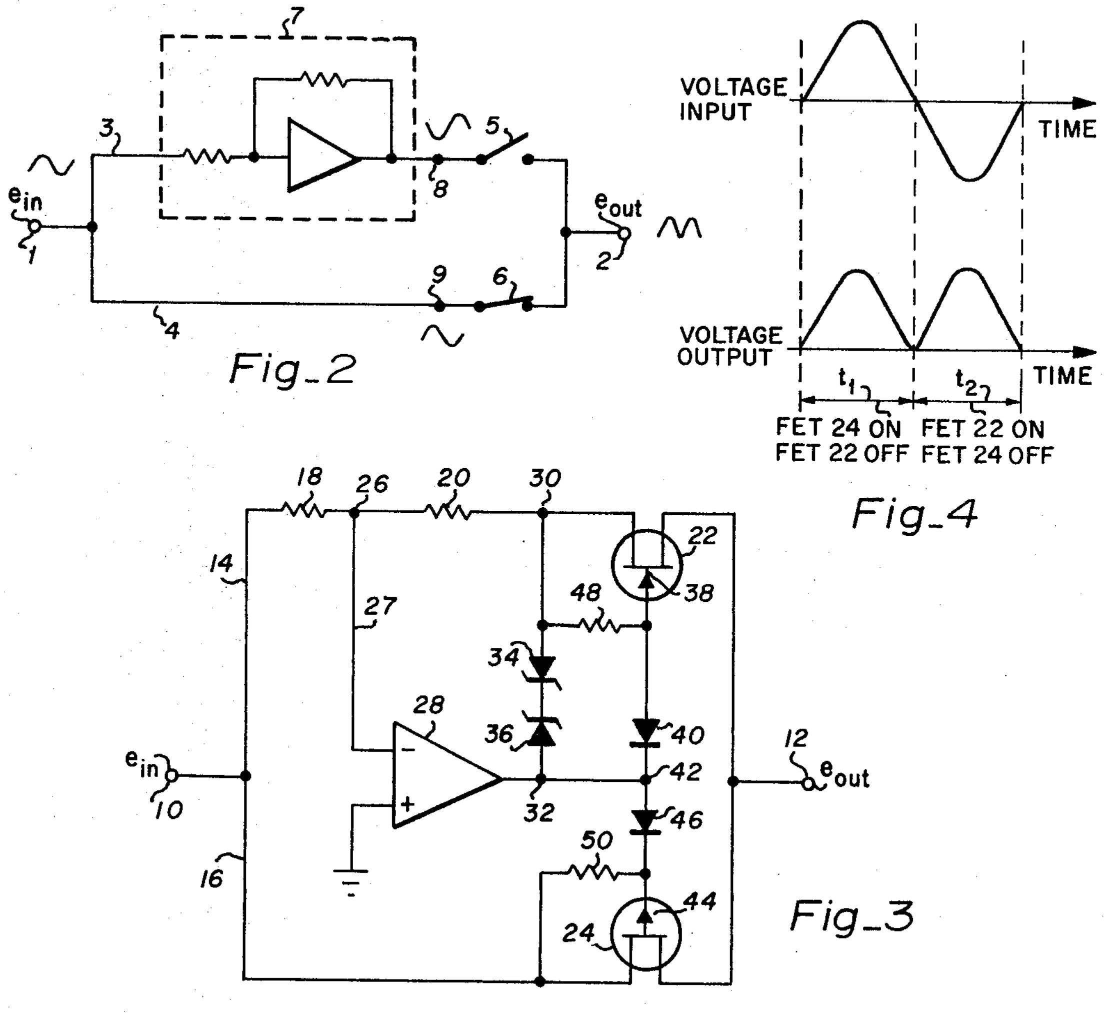
FIG. 2 is a schematic diagram of an elementary rectifying circuit illustrating the operation of the present invention.
FIG. 3 is a schematic diagram of a preferred embodiment of a precision full-wave rectifier in accordance with the present invention.
FIG. 4 is a timing device diagram which illustrates the operation of the present invention.

Referring now to FIG. 2 of the drawing, there is shown a simplified embodiment of a full-wave rectifier in accordance with the present invention. Connected between the input terminal 1 and the output terminal 2 are a pair of parallel circuits 3 and 4, each of which include a switch means 5 and 6 respectively. Circuit means 3 also includes an operational amplifying means 7 which is connected between the switch 5 and input terminal 1. The operation of the simplified circuit may be explained as follows.

Since the output of operational amplifier 7 is equal in magnitude but opposite in sign to the signal input thereto, the phase of the input signal appearing at circuit point 8 will always be 180° out of phase with that appearing at the input terminal 1. However, the signal appearing at terminal 9 in parallel circuit 4 will always have the same phase as the input signal. It should immediately be apparent that by closing one of the switches, for example, switch 6 for the first half cycle while opening the other switch during that period and then closing the switch 5 during the next half cycle and opening the switch 6 during that period, the output obtained at terminal 2 would correspond to full-wave rectification of the input signal at terminal 1. Thus, since the polarities of the signals at circuit point 8 and 9 are always 180° out of phase due to operational amplifier 7, a full-wave rectifying circuit is obtained by providing a means for controlling the switches 5 and 6 in response to the polarity of the input signal, or in the alternative, the polarity at circuit point 8.

Referring now to FIG. 3 of the drawing, a schematic diagram of a precision rectifier circuit is comprised of an input terminal 10 and an output terminal 12, the two of which are operatively coupled together by a pair of circuits 14 and 16 connected in parallel therebetween. The circuit 14 is comprised of a pair of matched resistors 18 and 20 connected in series with a switching means 22 which may, for example, be a field-effect transistor (FET) as illustrated. The circuit 16 includes a single switching means 24 which also may be an FET.

Connected to the point 26 in the circuit 14 between resistors 18 and 20 is an input 27 to an operational amplifier 28, for example an LM201, which is operated simultaneously in two modes, i.e., as a linear amplifier, and as a switch driver for effecting operation of the FETs 22 and 24. Connected between a point 30 in the circuit 14 and an output 32 of amplifier 28 are a pair of back-to-back Zener diodes 34 and 36. The gate 38 of FET 22 is connected through a diode 40 to a junction point 42 which is common with circuit point 32. Likewise, the gate 44 of FET 24 is connected to junction point 42 through a diode 46. Biasing resistors 48 and 50 are provided between the source and gate of the FETs 22 and 24 respectively.

In operation, because resistors 18 and 20 are of equal resistance, of 10 k. ohms each for example, the voltage at point 30 is always equal in magnitude but 180° out of phase with the input signal $e_{in}$. This is, of course, due to the fact that the output of the amplifier 28 is 180° out of phase with its input. As will be explained in detail below, when $e_{in}$ is positive, the FET switch 24 is closed and FET switch 22 is open. Under these conditions $e_{in}$ is coupled directly to the output through FET switch 24. When $e_{in}$ is negative FET switch 24 is open and FET switch 22 is closed coupling the voltage at point 30 to the output 12 through FET 22. And since this output voltage is an inverted version of the negative output, the output is again positive and full-wave rectification has been achieved as illustrated in FIG. 4.

In order to more fully define the function of the various components of the inventive apparatus, consider the case when $e_{in}$ is positive. The current into resistor 18 will all flow into resistor 20, assuming of course, that the input of the operational amplifier 28 is of infinite resistance and is therefore an ideal operational amplifier. Since resistor 18 is equal in value to resistor 20, the voltage at circuit point 30 will be equal to $-e_{in}$ and the output voltage of the amplifier 28 at point 32 will be equal to $-(e_{in}+V_{34}+V_{36})$, where $V_{34}$ and $V_{36}$ are the voltage drops across the Zener diodes 34 and 36 respectively.

Because one diode is biased in the reverse or Zener direction and the other is biased in the forward direction, the potential at circuit point 32 is $V_{32}=-(e_{in}+0.5+5.6)$, where the diodes $V_{34}$ and $V_{36}$ are 1N4734 diodes with nominal 5.6 volt Zener voltages. Thus, even though $e_{in}$ may be very small, it is sufficient to turn off FET 22 via forward biased diode 40 leaving a high impedance path between point 30 and the output terminal 12. The FET 22 may, for example, be a 2N4392.

FET switch 24 is connected to point 32 through diode 46, but no voltage is transferred to its gate. Diode 46 is biased off since point 32 is more negative than the potential in circuit 16. Thus, the gate and source of FET 24, which may for example be a UC451, are at the same potential. This being the condition for minimum source to drain channel resistance in FET 24, the input voltage $e_{in}$ is therefore coupled directly to the output 12 through FET 24.

On the other hand when $e_{in}$ is negative, similar conditions apply but with opposite polarities so that FET 24 is off and FET 24 is on. Thus, the voltage at point 30 is always linearly related to that at the input terminal 10. Also, a nonlinear switching voltage having the desired polarity at the correct time is always available at point 32. The diodes 40 and 46, which may for example be IN459A's, merely switch noncritical voltages. The only critical requirement of the diodes 34 and 36 is that their Zener voltage must exceed the pinch-off voltage of the FETs. The FET switches 22 and 24 in the signal paths act as low value pure resistances with no offsets.

This circuit gives excellent results up to a few kilohertz. For high frequency operation, the FETs could be replaced with MOS FETs to take advantage of their superior high-speed switching characteristics. Also the operational amplifier 28 could be replaced with a higher bandwidth operational amplifier. One advantage of this circuit over prior art is that the resistors 18 and 20 merely have to be equal (or matched) and not accurate.

In order to obtain a negatively rectified output, the FETs 22 and 24 can be interchanged. In so doing the polarities of the diodes 40 and 46 must also be reversed.

After having read the above disclosure, it will be apparent that many alterations and modifications of the disclosed apparatus can be made without departing from the merits of the invention. I, therefore, intend that the scope of the appended claims be interpreted as including all such modifications which fall within the true spirit of the invention.

We claim:

1. Precision full-wave rectifier apparatus comprising:
input terminal means and output terminal means;
parallel circuit means connecting said input terminal means to said output terminal means, each of said circuit means including at least one switching element therein;
one of said parallel circuits additionally including an operational amplifier means as an operative element thereof, the output of which serves as a means for simultaneously switching one of said switch means ON and the other switch means OFF;
said switch means comprising field-effect transistors the gates of which are operatively connected to the output of said operational amplifier means;
said one parallel circuit means further including at least two matched resistor means in series circuit with the field-effect transistor means of that circuit, at least one of said resistance means comprising a portion of the feedback circuit of said operational amplifier means; and
said feedback circuit of said operational amplifier means further including a pair of back-to-back Zener diodes.

2. Precision full-wave rectifier means as recited in claim 1 wherein said FET switch means are of opposite conductivity type and the gates thereof are connected together through a pair of diode means connected in series.

3. Precision full-wave rectifier means as recited in claim 2 wherein the output of said operational amplifier means is connected to the gate circuit of said FET switching means at a point in the circuit connecting said diode means.